United States Patent [19]

Gagliardi

[11] 4,052,087

[45] Oct. 4, 1977

[54] FOLDABLE CASTER CHAIR FOR THE HANDICAPPED

[76] Inventor: Joseph A. Gagliardi, 2803 Sudberry Lane, Bowie, Md. 20715

[21] Appl. No.: 744,159

[22] Filed: Nov. 22, 1976

[51] Int. Cl.[2] .................... B62B 7/06

[52] U.S. Cl. .................... 280/650; 297/60; 280/43

[58] Field of Search .................... 280/647, 650, 43; 297/6, 35, 41, 59, 27, 60

[56] References Cited

U.S. PATENT DOCUMENTS

| | | | |
|---|---|---|---|
| 898,235 | 9/1908 | Lloyd | 297/41 |
| 1,087,928 | 2/1914 | Diemer | 280/650 |
| 1,869,365 | 8/1932 | Corduan | 297/60 |
| 2,472,407 | 6/1949 | David et al. | 297/60 X |
| 2,975,825 | 3/1961 | Gedris et al. | 297/41 |

*Primary Examiner*—Robert R. Song
*Attorney, Agent, or Firm*—Francis B. Francois

[57] ABSTRACT

A rigid, generally rectangular seat has front and rear leg assemblies pivotally connected thereto, so that the seat can be folded upwardly toward the rear leg assembly, and the front leg assembly can be folded beneath the seat. A pair of L-shaped arms is pivotally mounted on the rear leg assembly, one on each side, and the lower ends of the generally vertical portions of said arms are alignable with the front leg assembly when the chair is erect, and carry locking means thereon engageable with a locking means carried by the upper ends of the front legs. The L-shaped arms hold the chair in its erect position, but either can be released and swung aside to allow sideways movement of a person entering or leaving the seat.

10 Claims, 6 Drawing Figures

FOLDABLE CASTER CHAIR FOR THE HANDICAPPED

BACKGROUND OF THE INVENTION

1. Field of the Invention

The present invention relates generally to foldable chairs for use by the handicapped, and more particularly to a foldable caster chair that can be used by a handicapped person in everyday living around the home or in an office, and which is designed with arms that can be swung out of the way to provide for sideways movement by the handicapped individual entering or leaving the chair.

2. Description of the Prior Art

Providing mobility to persons who do not have the full use of their legs is a problem that has long been with man. It has become more acute in recent years, however, as the handicapped have begun to move with increasing numbers into the mainstream of both the social and business life of the community. Where once a handicapped individual was expected to simply remain at home, today men and women with various degrees of handicaps are often engaged in carrying out a nearly normal living pattern.

The need for mobility felt by handicapped individuals has been primarily addressed through the use of chairs provided with wheels, and many different designs have been offered therefor. For many years, such wheeled chairs were large, rigid structures, equipped on each side with large diameter driving wheels, and either fore or aft with stabilizing caster wheels. Originally designed to provide limited mobility in the hospital and at home, these rigid chairs are simply unsuitable to be repeatedly moved from one building or location to another, especially by automobile or mass transportation vehicles. Moreover, their bulk makes them difficult for the user to manipulate, especially in crowded rooms or around bathroom facilities.

Over the years there have been efforts at designing smaller wheeled chairs of this type, and as a result their bulk has been significantly decreased. Moreover, wheeled chairs with large driving wheels have also been designed so that they can be folded for easy transportation. The chair shown in U.S. Pat. No. 1,206,106 represents an early attempt at a folding wheeled chair, and that shown in U.S. Pat. No. 3,231,293 is representative of the kind of modern wheeled chairs with large driving wheels now in widespread use.

Chairs like that in U.S. Pat. No. 3,231,293 fill an important need for the handicapped person. They are especially useful for movement on the streets, in shopping centers, or elsewhere out-of-doors where a wide variety of terrain conditions can be encountered. The large driving wheels ease movement over rough terrain, and the generally rugged construction of the chairs adapts them to rough usage. But at the same time, such chairs have their limitation.

The primary problem with large driving wheel chairs, even though they embody modern design techniques, and light weight materials, is that they are still bulky and relatively heavy. Thus, they are difficult to maneuver within the home, in a bathroom, or about the average office, and they are somewhat difficult to transport from place to place. Moreover, an individual with severe limitations on self-movement can find it very difficult to transfer into and out of such a chair.

A need has thus been felt for a smaller wheeled chair, one that is more adapted to use indoors under relatively crowded conditions. In such chairs the large driving wheels are removed, and instead the chair is mounted on large caster wheels. Examples of such caster chairs are those which are the subject of U.S. Pat. Nos. 2,312,602, 2,383,039 and 3,306,297.

While the caster chair is less bulky than the wheeled chair with large driving wheels, it is still difficult to move from place to place. Thus, attempts have been made at designing a caster chair that can be folded, and each of the three patents just identified show such chairs. The concept of constructing a chair so that it can fold is of course old, as shown in U.S. Pat. Nos. 715,346 and 1,029,067, the former relating to a rocking chair equipped with a toilet opening. The problem has been to design a folding chair of the caster type, such that it can be readily used by the handicapped person, and which at the same time will be rigid when erected so as to have the full confidence of the user.

While several designs for folding caster chairs have been offered, they normally suffer from one or more disadvantages. Some are visibly frail in construction, and tend to wobble when used. Most handicapped persons find such a chair unsuitable, for above all they must have confidence that the chair will hold and not fail. As a result, rigidity of the erect chair is a necessary characteristic in a successful caster chair, for most handicapped individuals.

Along with the need for rigidity in a folding caster chair when such is erect goes the need for a design that will accomodate easy folding by the user, into a compact unit that can be easily carried in an automobile. Here, again, most folding chairs now available fail, either because they utilize a complex design that is difficult to fold, or because when folded they are still bulky and difficult to handle.

To understand the nature of this problem, consider an average handicapped business man, who travels about by automobile. Normally, he will have a folding wheeled chair of the large driving wheel type, to ensure his access into buildings and the ability to travel out of doors. But for indoor use, such as in the office, the home, or a hotel room, he has need of a smaller, caster chair.

The large , folding wheeled chair will normally be carried in the back seat of the automobile, since lifting it into the trunk is usually impossible for the handicapped person to accomplish. If a caster chair is also to be carried, it should fold sufficiently small that it, too, can be easily placed in the automobile. Such a caster chair should fold and unfold very easily and must be light in weight so that the handicapped individual can effectively handle it. Typically, the handicapped person must transport the caster chair to the automobile by carrying it on the lap, while moving in the large wheeled chair. The caster chair would be placed in the automobile first, and then the large wheeled chair would be handled in the usual way.

Ideally, the caster chair should also be constructed so that the user can easily enter into and maneuver about a normal bathroom. The chair should be designed so that the user can enter a shower, and use the water closet facilities, with no assistance from others required. Most presently available caster chairs fail in this respect.

Finally, the caster chair should be designed to allow the easy transfer of a handicapped individual entering and leaving the chair. A wheeled chair is normally provided with arms on either side of the seat member, to provide comfort, to confine the handicapped individual against falling to either side, and to assist in entering and leaving the chair. But some individuals must enter a chair by moving sideways, and must leave it in the same manner. In this instance, the arms must be designed so that they can be moved out of the way, to provide such lateral movements.

The problem of providing such movable arms has not yet been solved in foldable caster chairs, to the extent that the resulting structure is acceptable with respect to its other characteristics.

There is thus a need for a folding caster chair that meets all of the demands faced by a handicapped individual. That is, there is need for an easily foldable chair which is rigid when erect, light in weight and compact when in a folded condition, designed for use in the bathroom, and which at the same time incorporates normally rigid arms that can be moved out of the way to allow the handicapped individual to move sideways when entering or leaving the chair. The present invention is intended to satisfy this need.

SUMMARY OF THE INVENTION

The foldable caster chair of the invention includes a rigid, generally rectangular seat, and front and rear leg assemblies that are pivotally connected to the front and rear corners, respectively, of the seat. The front leg assembly can be folded upwardly under the seat, while the seat itself can be folded upwardly toward the back of the chair carried by the rear leg assembly. The bottoms of the legs are equipped with caster wheels, and the chair can be folded into a nearly flat condition so that it has minimum dimensions.

The chair of the invention includes two rigid, L-shaped arms that function both as normal arm rests, and to secure the chair in a rigid condition when erect. At the same time, either of the arms can be released and swung out of the way when desired, to allow the user to enter or leave the chair by moving sideways. When one arm is swung away, the other maintains the chair in a rigid condition.

The outer ends of the horizontal portions of the L-shaped arms are pivotally mounted on the upward extensions of the rear legs, so that they can be swung into and out of their erect positions. The lower ends of the vertical portions of the L-shaped arms are arranged to confront the upper ends of the front legs, and locking means are provided to detachably connect them to the front legs when the chair is erect, whereby a rigid structure is provided.

In the preferred embodiment of the invention the upper ends of the front legs have stub shafts projecting therefrom. The lower ends of the vertical portions of the L-shaped arms carry slidable locking sleeves, which are engageable over these stub shafts to secure the chair in its erect position. When the user wishes to enter or leave the chair in a sideways movement, the locking sleeve on the appropriate side is merely released, and the arm is swung out of the way.

When the user wants to fold the chair, both of the locking sleeves are released. Thereafter, the front leg assembly and the rear leg assembly can both be folded relative to the rigid seat.

The space between the rear legs of the present chair is unobstructed beneath the seat portion, and the rear legs are spaced apart a substantial distance, usually about 18 inches or so. Thus, the chair can be easily backed over the bowl of a conventional water closet. In the preferred embodiment of the invention, the seat is provided with a padded seat element having a toilet opening therein, so that the user can visit the bathroom without the need to leave the chair.

The upper ends of the rear legs are preferably fitted with removable or foldable handles, so that if desired another person can easily move the chair about with an individual sitting in it.

It is the principal object of the present invention to provide a caster chair that can be easily folded into a compact configuration, and which will be essentially rigid when in an erect position.

Another object is to provide a foldable caster chair that can be used in the bathroom, and elsewhere about the home or office.

Yet another object is to provide a foldable caster chair having arms on both sides of the seat, which arms can be selectively swung out of the way to provide for lateral movements into and out of the chair seat.

Still another object is to provide a foldable caster chair with moveable arms, constructed to remain rigid while one of the arms is swung out of its normal, locked position.

Other objects and many of the attendant advantages of the invention will become readily apparent from the following Description of the Preferred Embodiment, when taken in conjunction with the attached drawings.

DESCRIPTION OF THE PREFERRED EMBODIMENT

Figure 1:
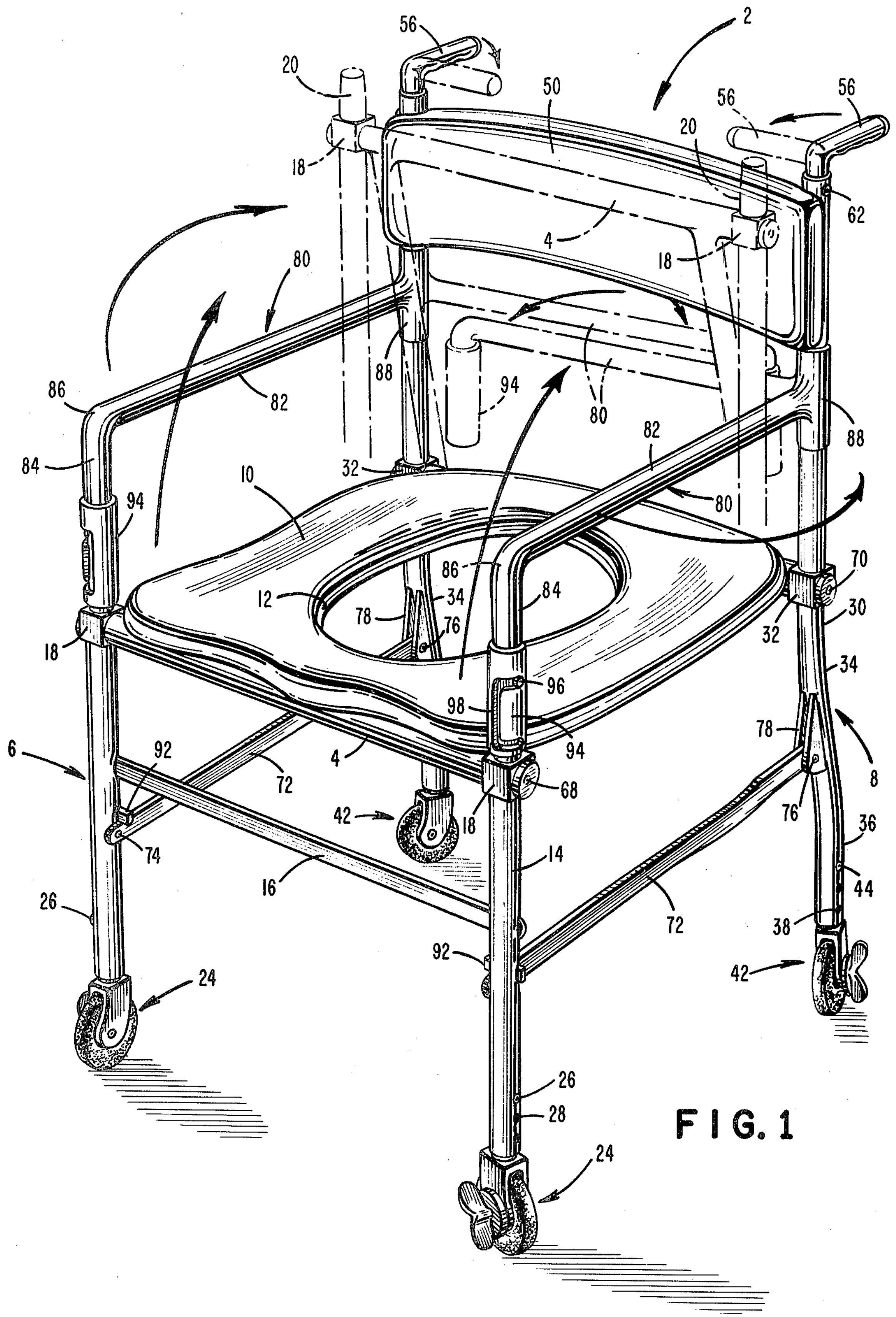
FIG. 1 is a perspective view of the foldable caster chair of the invention.

Referring now to the drawings, the foldable caster chair of the invention is indicated generally at 2, and includes a rigid rectangular seat frame 4, a front leg assembly 6, and a rear leg assembly 8. The seat frame 4 has a padded seat element 10 secured thereto, which is preferably provided with a toilet seat opening 12. If desired, the toilet seat opening 12 can be omitted for the comfort of a particular user, but in this instance the user would need to leave the chair to use a toilet.

The front leg assembly 6 includes two front legs 14, connected by a front brace 16. Bearing blocks 18 are positioned on the front legs 14 near the upper ends thereof, and stub shafts 20 project upwardly therefrom. The lower ends of the front legs 14 are hollow, and receive the mounting shafts 22 of front caster wheels 24. The shafts 22 are secured in place by pins 26, arranged to pass through a selected transverse bore 28 chosen from a series of such bores provided in the front legs 14. The series of bores 28 allow the user to select the height of the seat frame 4 shown above the floor, over the range provided by such bores.

The rear leg assembly includes two rear legs 30, which are substantially greater in length than the front legs 14, say about twice as long. The rear legs 30 have bearing blocks 32 about midway their lengths, and therebeneath said legs include rearwardly angled portions 34 and vertical, hollow lower portions 36 that have transverse bores 38 therethrough, corresponding to the transverse bores 28. The shafts 40 of rear caster wheels 42 are received in the lower portions 36 of the rear legs 30, and are secured by pins 44. The rearwardly extending portions of the rear legs 30 add stability to the chair 2, when the user pushes such in a rearward direction. However, if desired, it is to be understood that the reverse bend in said rear legs 30 can be eliminated, without adversely affecting the foldability of the present chair.

Figure 3:
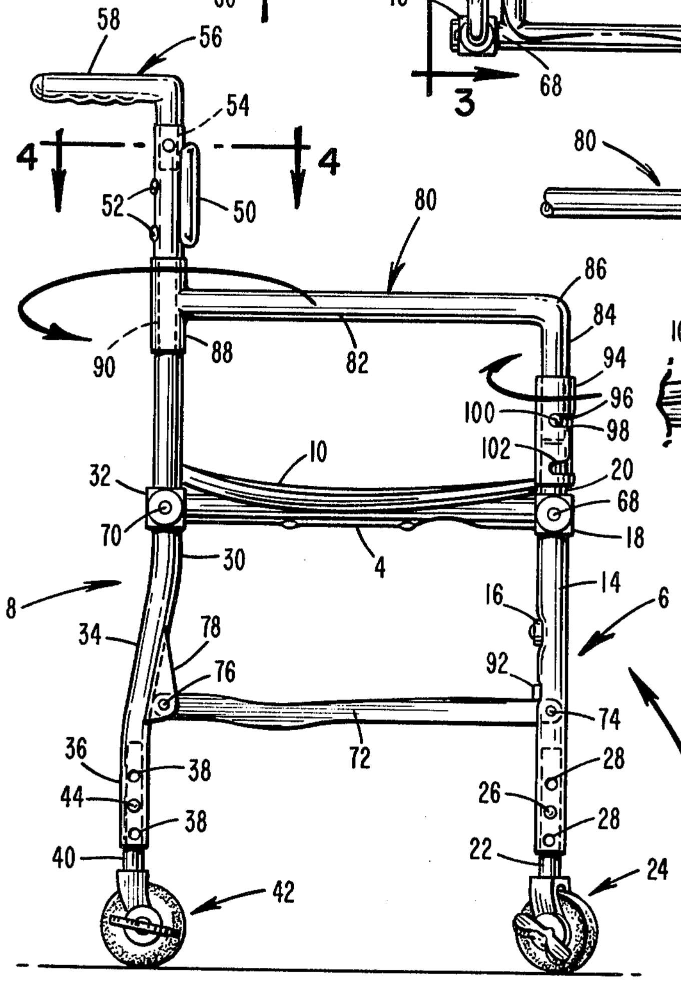
FIG. 3 is a side elevational view of the chair of FIG. 1, and shows the manner in which the front and rear leg assemblies are arranged, and how the L-shaped arms are mounted.
Figure 6:
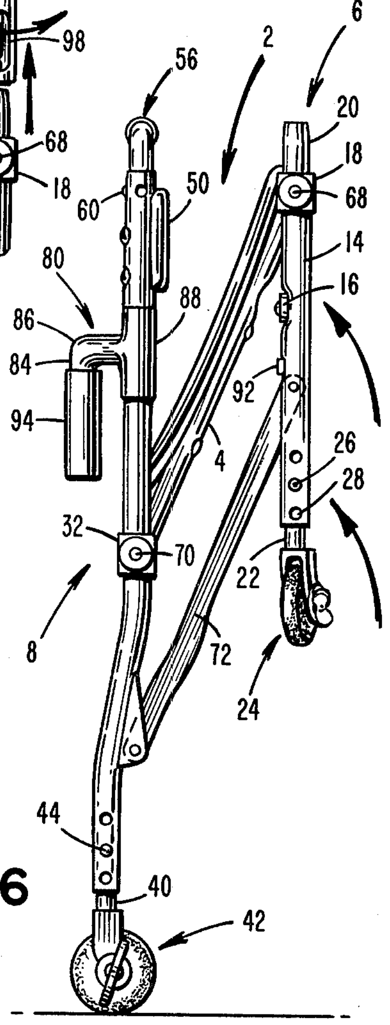
FIG. 6 is a side elevational view of the caster chair in a partially folded condition.

The rear legs 30 are connected near their upper ends by a back member 50, secured thereto by screws 52 or in another suitable manner. The upper ends of the rear legs 30 are hollow to receive the shaft portions 54 of handles 56 provided with hand grips 58 on their outer ends. The handles 56 are designed so that they can either be removed entirely, or simply turned inwardly to an inoperative position, lying generally in the plane of the rear leg assembly 8. The upper ends of the rear legs 30 have two bores 60 therein, arranged in the same plane and at right angles to each other. The shafts 54 each carry a detent member 62 in a recess 64 therein, and which is biased by a spring 66. The detents 62 are engageable in a selected one of the two bores 60, to either secure the handles 56 in an erect position as shown in FIG. 3, or in a folded position, as shown in FIG. 6. Alternately, the detents 62 can simply be depressed, and the handles 56 removed from the rear legs 30.

The front corners of the seat frame 4 have horizontally projecting bearing shafts 68 thereon, which are receiveable through bores provided in the bearing blocks 18 to thereby pivotally mount the front leg assembly 6 to the seat frame. Similarly, the rear corners of the seat frame have horizontally projecting bearing shafts 70 thereon, receivable within bores provided in the bearing blocks 32. The precise design and arrangement of the bearing means for pivotally connecting the seat member 4 with the front and rear leg assemblies 6 and 8 is of course a matter of choice, although it has been found that a simple cylindrical shaft and cylindrical bore arrangement will function adequately. Regardless of the structural arrangement chosen, the bearing means should provide a pivotal joint that will give rigidity to the chair against lateral wobbling movements, and the cylindrical shaft arrangements of the preferred embodiment does so.

It will be seen that the front leg assembly 6 is thus mounted for pivotal movement, whereby it can be folded backwardly and upwardly against the seat frame 4. Similarly, the rear frame assembly 8 is mounted so that the seat frame 4 can be folded upwardly theretoward, these folding movements being best understood by reference to FIG. 6. In order to coordinate the folding movements of the front and rear leg assemblies 6 and 8, and to add structural rigidity to the chair, brace rods 72 are provided on each side. The front ends of the brace rods 72 are pivotally secured to the front legs 14 by pins 74, and the rear ends thereof are pivoted by pins 76 to brackets 78 provided on the inner sides of the rear legs 30. If the rear legs 30 are constructed to be straight without the angled portions 34, then the brackets 78 can be eliminated.

It will be evident from an examination of FIG. 6 that the chair 2 can be easily folded into a compact configuration, and then unfolded. No complicated structure is involved, just the front and rear leg assemlies 6 and 8 pivoted directly to the rigid seat frame 4. However, it is also evident that when the chair is erect, with the legs 14 and 30 projecting downwardly generally normally from the seat frame 4, the leg assemblies would be free to pivot at will, unless prevented from doing so.

In the invention, the chair 2 is made rigid when in its erect position by the use of two L-shaped arms 80, one on each side of the chair, and each of which includes a generally horizontal portion 82 connected to a generally vertical portion 84 by a rounded elbow 86. The arms 80 are themselves rigid, and the outer ends thereof are welded or otherwise rigidly connected to elongated mounting sleeves 88 rotatably mounted on the upper portions of the rear legs 30. The mounting sleeves 88 are received on recessed portions 90 of the rear legs 30, so that upward and downward sliding movements thereof cannot occur.

Figure 2:
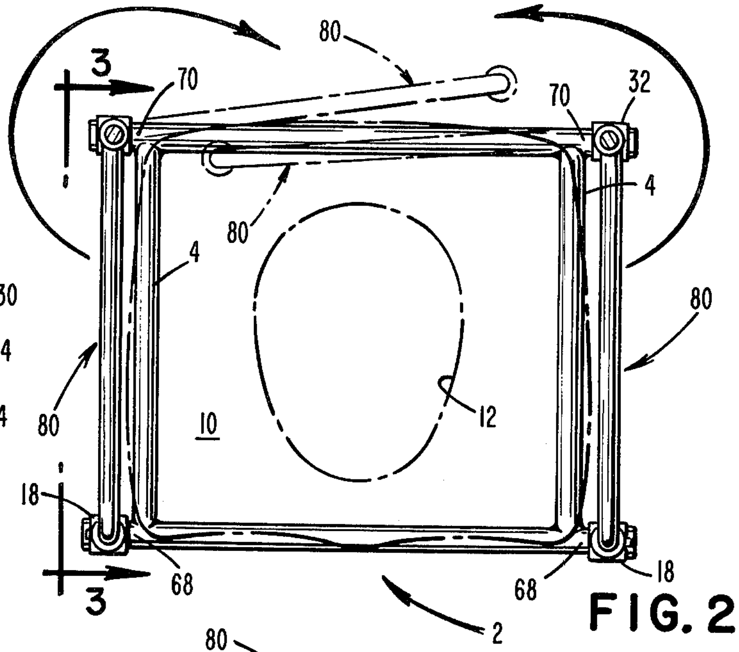
FIG. 2 is a horizontal sectional view of the chair in FIG. 1, taken just above the arms, and shows in particular how the L-shaped arms are swung away from their n normal, secured positions.
Figure 5:
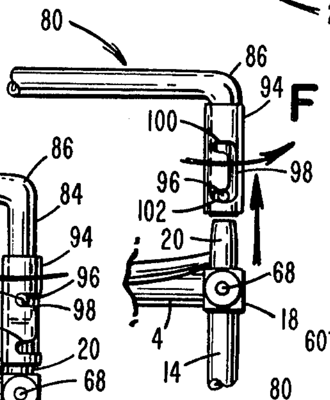
FIG. 5 is an enlarged, fragmentary view showing the locking sleeve in its raised or retracted position, and the stub shaft on the upper end of one of the front legs.

The L-shaped arms 80 are thus mounted so that they can be swung in a generally horizontal plane, as indicated by arrows in the drawing, from a position wherein the vertical portions 84 are aligned with the stub shafts 20, to a position as shown in FIGS. 2 and 6, wherein they are disposed behind the rear leg assembly 8. As best shown in FIG. 5, the arms 80 are so dimensioned that when the lower ends of the vertical portions 84 are positioned to confront the upper ends of the stub shafts 20, with the front legs 14 erect, only a very small space is present between the abutting surfaces. Thus, the rigid L-shaped arms 80, when so positioned, prevent upward movement of the stub shafts 20, and thereby prevent any folding of the front leg assembly 14.

In order to ensure that the front leg assembly 14 is fully erected when the chair is unfolded, and to prevent folding of the chair in a reverse direction, stops can be provided at convenient locations on the elements of the chair. Referring to FIG. 3, such stops are shown at 92 on the front legs 14, to be engaged by the pivoted side brace rods 72. Other stops can be employed where desired.

In order to secure the chair 2 in its erect position and to make it rigid for use, the vertical portions of the L-shaped arms 80 carry locking sleeves 94 on the lower ends thereof. The locking sleeves 94 are retained on the arm portions by screws 96, which are received within elongated slots 98 in the locking sleeve, and which terminate in upper and lower, transverse locking slots 100 and 102, respectively. As will be appreciated from a comparison of FIGS. 3 and 5, the locking slots 100 and 102 serve to secure the locking sleeves 94 in their locking and retracted positions, respectively.

It is to be understood that the locking sleeves 94 can be mounted on the L-shaped arms by another arrangement than the screw and slot arrangement shown, although such is preferred because it is simple for a handicapped person to manipulate, and economical to construct. Further, it should be understood that the locking sleeve 94 could alternatively be mounted on the stub shafts 20, although such an arrangement would tend to make the stub shafts 20 project too far above the seat frame 4. Finally, it should also be understood that other locking means could be utilized to detachably connect the L-shaped arms with the upper ends of the front legs 14.

When the locking sleeves 94 are in their locking positions as shown in FIG. 3, the front leg assembly 6 is fixed in position relative to the seat frame 4, and the chair is rigid. The chair can then be used by an individual, with no fear of collapse. When it is desired to fold the chair for transport, this is easily accomplished by first moving the locking sleeves 94 to their retracted positions, and then swinging the L-shaped arms 80 out of alignment with the stub shafts 20. The chair can then be folded as shown in FIG. 6.

It is the L-shaped, rigid arms 80, rotatably mounted on the rear legs 30, which give the chair its unique rigidity. The angled horizontal and vertical portions 82 and 84, being rigidly connected, in effect form a truss that braces the front legs 14 and prevents their movement. At the same time, the horizontal portions 82 of the arms 80 provide arm rests for the user, and the L-shaped arms 80 ensure that the user cannot fail sideways out of the chair.

Should a user need to enter or leave the chair through a sideways movement, as is often used to transfer to or from a regular chair or a bed, this can be easily accomplished with the invention. The chair 2 is first merely positioned by the surface to which the person is to transfer, or from which entry into the chair is wanted. Then, the locking sleeve 94 on that side of the chair is released, and the associated L-shaped arm 80 is swung out of the way. The remaining L-shaped arm 80 is sufficient to assure the continued rigidity of the chair. After the transfer is completed, the arm can be swung back into position.

The present chair is ideally suited for bathroom use by an individual, if the overall dimensions thereof are properly proportioned. In order to provide maximum maneuvering capability, the overall width of the chair should be no more than about 20 inches, and the distance between the rear legs 30 should be about 18 inches. Further, the space between the rear legs 30 beneath the seat frame 4 should be totally unobstructed, so that the chair can be easily backed over the bowl of a water closet or commode.

Returning again to the L-shaped arms 80, it has been found that a preferable height for the horizontal portions 82 thereof is about 8 inches above the seat member 10. Typically, the depth of the seat member 10 will be about 18 inches. It is understood, of course, that all of these dimensions can be varied, to suit the individual and his or her specific needs.

Figure 4:
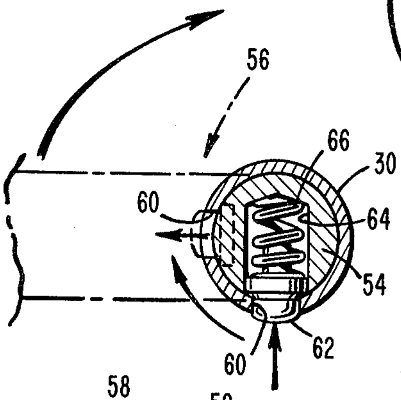
FIG. 4 is an enlarged, fragmentary sectional view taken on line 4—4 in FIG. 3, and shows the detent mechanism for securing the handles in their erect position.

Should it be desired to add yet further rigidity to the chair, this can be accomplished by modifying one or more of the bearing means to include a suitable releasable locking means. For example, a detent like that shown in FIG. 4 could be mounted in either or both of the bearing blocks 18, to engage the shafts 68 when the front legs 14 are erect. While the provision of such supplemental locking devices is not necessary to the rigidity of the chair under normal circumstances, some handicapped individuals may feel the need for such additional security.

Obviously, many further modifications and variations of the invention are possible, within the scope of the teachings as herein shown and described.

I claim:

1. A foldable caster chair for use by the handicapped, comprising:

a rigid, generally rectangular seat member having first bearing means on each of its opposite front corners, and second bearing means on each of its opposite rear corners;

a front leg assembly, including a pair of front legs each having third bearing means thereon near their upper end, said third bearing means being engaged with said first bearing means to pivotally mount said front leg assembly to the front corners of said seat member, so that said front leg assembly can be folded backwardly beneath said seat member;

a rear leg assembly, including a pair of rear legs, said rear legs being substantially longer than said front legs and each having fourth bearing means centrally thereon, said fourth bearing means being engaged with said second bearing means to pivotally mount said rear leg assembly to the rear corners of said seat member, so that said seat member can be folded upwardly toward said rear leg assembly;

a pair of L-shaped arms, each including a generally horizontal portion and a generally vertical portion;

means pivotally mounting the outer end of the generally horizontal portion of each of said L-shaped arms on the upper portion of one of said rear legs, said L-shaped arms being of a length so that the lower ends of the generally vertical portions thereof are alignable with said front legs when both of said front leg assembly and said rear leg assembly are in an erect position relative to said seat member, and said L-shaped arms being pivotally mounted to swing in a generally horizontal plane when said front and rear leg assemblies are in said erect position, from a position wherein said generally vertical portions of said L-shaped arms are generally aligned with their respective front legs to a position wherein said L-shaped arms present no obstacle to the sideways movement of a person entering or leaving said seat member;

first locking means on the upper ends of said front legs;

second locking means on the lower ends of said generally vertical portions of said L-shaped arms, releasably engageable with said first locking means to releasably secure said rigid seat member, said front leg assembly and said rear leg assembly in said erect position; and caster wheels mounted on the lower ends of each of said front legs and said rear legs.

2. A foldable caster chair as recited in claim 1, wherein said upper portions of said rear legs are connected by a back member.

3. A foldable caster chair as recited in claim 1, wherein said rigid seat member includes a central toilet openings, and wherein the space between the portions of said rear legs beneath said seat member is unobstructed and of sufficient width so that said chair can be backed over a conventional water closet bowl.

4. A foldable caster chair as recited in claim 1, wherein said L-shaped arms are rigidly constructed, and wherein said means for pivotally mounting said arms on the upper portions of said rear legs includes:

an elongated sleeve rotatably mounted on each rear leg, the outer end of the generally horizontal portion of one of said rigid, L-shaped arms being rigidly secured to each of said elongated sleeves; and means on said rear legs arranged to prevent upward or downward sliding movements of said elongated sleeves.

5. A foldable caster chair as recited in claim 4, wherein said first locking means comprises a stub shaft on each of said front legs, arranged to project upwardly from said third bearing means, and wherein said second locking means includes:

a locking sleeve carried by the lower end of the generally vertical portion of each of said L-shaped arms, and arranged for translational movement thereon; and means securing said locking sleeves to the lower ends of said generally vertical portions, said stub shafts and said L-shaped arms being arranged to that when the generally vertical portions of said arms are aligned with said stub shafts, the lower ends of said vertical portions and the upper ends of said stub shafts will be in closely spaced, abutting relationship, and said locking sleeves being arranged to be moved to an engaged position wherein they are received on substantial portions of both said generally vertical arm portions and said stub shafts.

6. A foldable caster chair as recited in claim 1, including additionally;

handle means mounted on the upper end of each of said rear legs.

7. A foldable caster chair as recited in claim 6, wherein said handle means are retractably mounted.

8. A foldable caster chair as recited in claim 1, wherein said seat member includes:

a rigid rectangular frame; and a padded seat element secured to said frame.

9. A foldable caster chair as recited in claim 8, wherein said padded seat element has a central toilet opening therein.

10. A foldable caster chair as recited in claim 1, wherein said chair is about 20 inches in width, and said generally horizontal portions of said L-shaped arms are spaced about 8 inches above said seat member, said caster wheels being mounted by adjustable means allowing the height of said seat member above the floor to be selected over a given range.

* * * * *